(12) United States Patent
Kasperovics et al.

(10) Patent No.: US 10,810,259 B2
(45) Date of Patent: Oct. 20, 2020

(54) GRAPH DATA DERIVATIVES

(71) Applicant: SAP SE, Walldorf (DE)

(72) Inventors: Romans Kasperovics, Speyer (DE); Jan Bross, Sandhausen (DE); Thomas Fischer, Sandhausen (DE); Marcus Paradies, Erfurt (DE); Cornelia Kinder, Walldorf (DE)

(73) Assignee: SAP SE, Walldorf (DE)

( * ) Notice: Subject to any disclaimer, the term of this patent is extended or adjusted under 35 U.S.C. 154(b) by 197 days.

(21) Appl. No.: 15/940,560

(22) Filed: Mar. 29, 2018

(65) Prior Publication Data
US 2019/0303505 A1 Oct. 3, 2019

(51) Int. Cl.
*G06F 16/901* (2019.01)
*G06F 16/23* (2019.01)
*G06F 16/28* (2019.01)
*G06F 16/22* (2019.01)

(52) U.S. Cl.
CPC ...... *G06F 16/9024* (2019.01); *G06F 16/2282* (2019.01); *G06F 16/23* (2019.01); *G06F 16/284* (2019.01)

(58) Field of Classification Search
CPC .... G06F 16/9024; G06F 16/23; G06F 16/284; G06F 16/2282
USPC .......................... 707/703, 802, 758, 797, 798
See application file for complete search history.

(56) References Cited

U.S. PATENT DOCUMENTS

| | | | |
|---|---|---|---|
| 7,287,192 B1 | 10/2007 | Engel | |
| 10,061,715 B2 * | 8/2018 | Choi | G06F 21/6227 |
| 10,387,453 B1 * | 8/2019 | Norton | G06F 16/9024 |
| 10,394,855 B2 * | 8/2019 | Fischer | G06F 16/288 |
| 10,528,897 B2 * | 1/2020 | Labat | G06Q 10/06 |
| 2015/0370919 A1 | 12/2015 | Bornhoeved | |
| 2017/0213127 A1 * | 7/2017 | Duncan | G16B 50/00 |
| 2017/0228418 A1 * | 8/2017 | Levin | G06F 16/9024 |
| 2018/0218088 A1 | 8/2018 | Fischer | |
| 2018/0239796 A1 * | 8/2018 | Song | G06F 16/9024 |
| 2018/0329953 A1 * | 11/2018 | Weld | G06F 16/252 |

* cited by examiner

*Primary Examiner* — Phong H Nguyen
(74) *Attorney, Agent, or Firm* — Mintz Levin Cohn Ferris Glovsky and Popeo, P.C.

(57) ABSTRACT

A method for executing a graph algorithm may include responding to a request from a client to execute a graph algorithm on graph data stored in a database by determining data required to execute the graph algorithm. In response to determining that a first portion of the data required to execute the graph algorithm is absent from an existing adjacency structure that includes a second portion of the data required to execute the graph algorithm, the existing adjacency structure may be modified to include the first portion of data. The graph algorithm may be executed based on the modified adjacency structure. The execution of the graph algorithm may include querying, based on the modified adjacency structure, the graph data stored in the database. Related systems and articles of manufacture, including computer program products, are also provided.

13 Claims, 6 Drawing Sheets

GRAPH DATA DERIVATIVES

TECHNICAL FIELD

The subject matter described herein relates generally to database processing and more specifically to derivatives of graph data stored in a database.

BACKGROUND

A database may be configured to store data in accordance with a database schema. For example, in a graph database, data may be represented and stored using graph structures including, for example, vertices, directed edges, undirected edges, and/or the like. Notably, the graph database may store the relationships between different data items explicitly. For instance, the vertices of a graph may correspond to the individual data items stored in the graph database while the edges of the graph may define the relationships between these data items. Attributes associated with the vertices and/or the edges may provide additional properties for the data items stored in the graph database and/or the relationships that exist between different data items.

By contrast, a relational database may store the relationships between different data items implicitly, for example, by organizing the data items into one or more database tables. Each database table may store a set of data items referred to as a relation. Furthermore, the rows of the database table may hold individual data items while the columns of the database table may hold the attributes that are present in each of the data items. Meanwhile, relationships between data items residing in different database tables may be implicitly defined by cross referencing the key that is associated with each data item in the relational database. For instance, a first database table may store the keys of data items from a second database table, thereby linking data items held in two separate database tables. Alternately and/or additionally, data items from the first database table and the second database table may be linked via a third database table storing the keys of data items from both the first database table and the second database table.

SUMMARY

Systems, methods, and articles of manufacture, including computer program products, are provided for executing a graph algorithm based on an adaptable adjacency list. In one aspect, there is provided a system including at least one data processor and at least one memory. The at least one memory may store instructions that cause operations when executed by the at least one data processor. The operations may include: responding to a request from a client to execute a graph algorithm by at least generating a derivative graph of a graph, the graph algorithm being executed on the graph, and the graph being associated with graph data stored in a database; in response to determining that the derivative graph is defined as a snapshot of the graph, applying a change to a temporary attribute associated with the graph without propagating the change to the derivative graph; and in response to determining that the derivative graph is defined as a view of the graph, propagating, to the derivative graph, the change to the temporary attribute associated with the graph.

In some variations, one or more features disclosed herein including the following features can optionally be included in any feasible combination. The graph data may include a plurality of vertices. The graph data may further include one or more edges interconnecting the plurality of vertices. The database may be a relational database that includes a vertex table and an edge table for storing the graph data. The storage of the graph data may include storing a first attribute associated with each of the plurality of vertices and/or each of the one or more edges. The graph algorithm may modify the graph data by at least changing the first attribute, and/or adding a second attribute to each of the plurality of vertices and/or each of the one or more edges. The graph data stored in the database may be read only. The temporary attribute may store the modification to the graph data.

In some variations, the derivative graph may inherit, from the graph, the temporary attribute such that the derivative graph includes the temporary attribute. The derivative graph may be defined as the snapshot and/or the view based at least on a declaration included in programming code implementing the graph algorithm. The declaration may indicate whether the derivative graph is the snapshot and/or the view of the graph.

In some variations, the derivative graph may be a sub-graph of the graph. The sub-graph may include some but not all of a plurality of vertices and/or edges included in the graph.

In some variations, the derivative graph may be an inverse graph of the graph. The inverse graph may reverse a directionality of one or more edges interconnecting a plurality of vertices comprising the graph.

In some variations, the graph algorithm may be executed based at least on the derivative graph.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to web application user interfaces, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

A relational database may be configured to store a graph by at least storing the corresponding graph data in a vertex table and an edge table. For example, storing the graph in the relational database may include storing, in the vertex table, the vertices of the graph including, for example, the keys and the attributes associated with each vertex. Furthermore, storing the graph in the relational database may include storing, in the edge table, the edges of the graph including, for example, the keys and the attributes associated with each edge. In some example embodiments, the graph may be stored in the relational database as a persistent graph. Accordingly, the relational database may provide read-only access to the corresponding graph data stored in the relational database, for example, in the vertex table and/or the edge table. But a graph algorithm operating on the graph may modify the graph data including, for example, the attributes associated with one or more of the vertices and/or edges of the graph. As such, in order to execute the graph algorithm, the graph may be associated with one or more temporary attributes for storing the modifications made to the read-only graph data stored in the relational database.

In some example embodiments, executing the graph algorithm may further require generating a derivative graph of the graph. For example, the derivative graph may be a sub-graph that includes some but not all of the vertices and/or edges present in its parent graph. Alternatively and/or additionally, the derivative graph may be an inverse graph in which the directionality of the edges connecting the vertices of the parent graph are reversed. In some example embodiments, the derivative graph may inherit the temporary attributes associated with its parent graph but changes to these temporary attributes may or may not be propagated from the parent graph to the derivative graph. For instance, the derivative graph may be defined as a view of the parent graph, in which case changes to the temporary attributes of the parent graph are propagated to the derivative graph. By contrast, defining the derivative graph as a snapshot of the parent graph may confine the changes to the temporary attributes to the parent graph.

Figure 1:
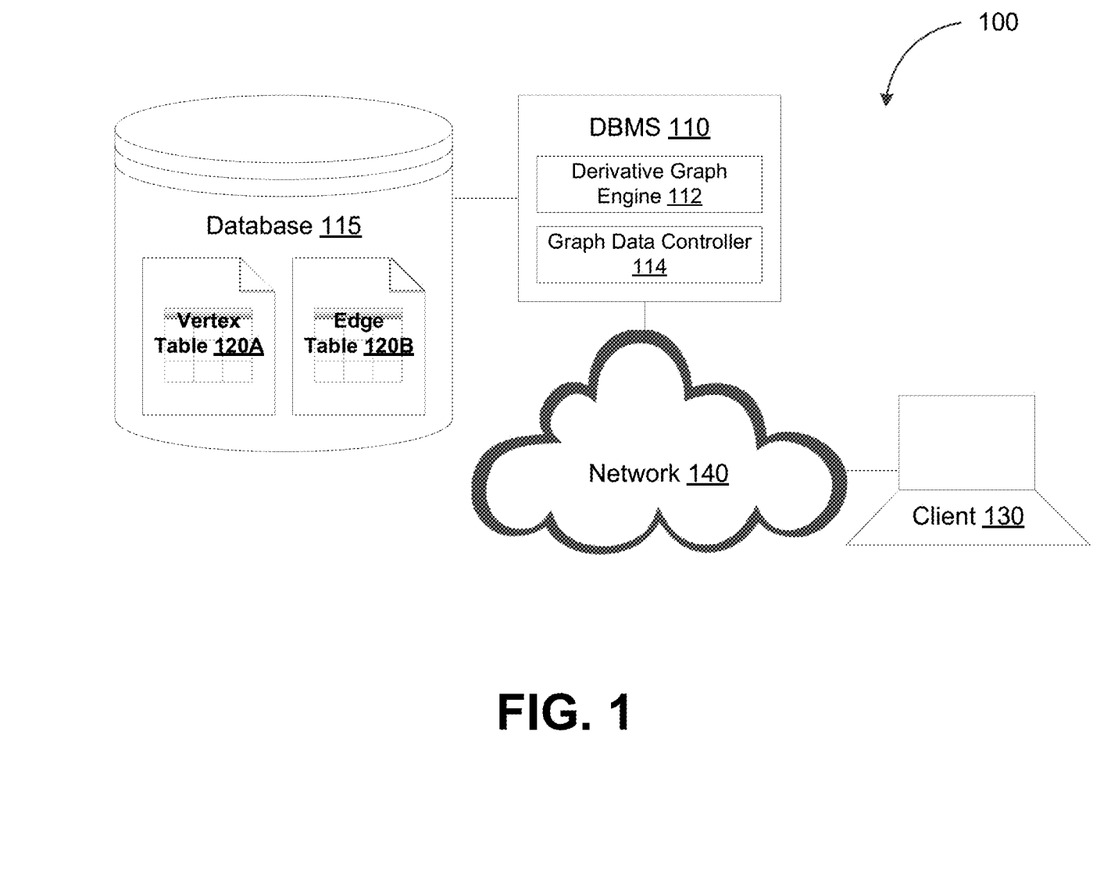
FIG. 1 depicts a system diagram illustrating a data storage system, in accordance with some example embodiments.

FIG. 1 depicts a system diagram illustrating a data storage system 100, in accordance with some example embodiments. Referring to FIG. 1, the data storage system 100 may include a database 115 storing graph data corresponding to one or more graphs. The graph data associated with a graph may include the vertices and/or the edges forming the graph.

As such, in some example embodiments, the database 115 may be a relational database configured to store the graph data, for example, in a vertex table 120A and/or an edge table 120B. For example, the vertex table 120A may store the vertices of the graph including, for example, the keys and/or the attributes associated with each vertex. Meanwhile, the edge table 120B may store the edges of the graph including, for example, the keys and/or the attributes associated with each edge. It should be appreciated that the database 115 may be any type of database including, for example, an in-memory database, a hierarchical database, an object database, an object-relational database, a non-Structured Query Language (NoSQL) database, and/or the like. For example, instead of and/or in addition to being a relational database, the database 115 may be a graph database, a column store, a key-value store, a document store, and/or the like.

The database 115 may be coupled with a database management system 110 that includes, for example, a derivative graph engine 112 and a graph data controller 114. In some example embodiments, the database management system 110 may be configured to respond to requests from one or more clients of the data storage system 100 including, for example, a client 130. For example, as shown in FIG. 1, the client 130 may communicate with the database management system 110 via a network 140, which may be any wired and/or wireless network including, for example, a public land mobile network (PLMN), a wide area network (WAN), a local area network (LAN), a virtual local area network (VLAN), the Internet, and/or the like.

The client 130 may send, to the database management system 110, a request to execute, on at least a portion of the graph data stored in the database 115, a graph algorithm including, for example, shortest path, risk propagation, minimum flow, page rank, and/or the like. As used herein, a graph algorithm may refer to any algorithm that derives a solution by operating on graph data which, as noted, may include vertices interconnected by one or more directed and/or undirected edges. It should be appreciated that the graph algorithm may be a predefined graph algorithm and/or a custom graph algorithm defined by the client 130. Furthermore, the graph algorithm may be defined as a stored procedure such that the database management system 110 may store, in the database 115, the executable code corresponding to the graph algorithm.

The database management system 110 may respond to the request from the client 130 by at least executing the graph algorithm. In some example embodiments, the graph algorithm may define one or more derivative graphs of a graph. For instance, the graph algorithm may define a subgraph that includes some but not all of the vertices and/or edges present in a parent graph. Alternatively and/or additionally, the graph algorithm may define an inverse graph the reverses the directionality of the edges connecting the vertices of the parent graph. As noted, the graph data corresponding to the graph may be stored in the database 115, for example, in the vertex table 120A and/or the edge table 120B. However, it should be appreciated that the one or more derivative graphs of the graph may not be stored in the database 115. Instead, derivative graphs may be exist temporarily, for example, for the duration of execution of the graph algorithm.

The database management system 110 may provide read-only access to the graph data stored in the database 115, for example, in the vertex table 120A and/or the edge table 120B. That is, the database management system 110, for example, the graph data controller 114, may execute the graph algorithm without modifying the graph data stored in the vertex table 120A and/or the edge table 120B. Instead, the graph algorithm may define one or more temporary attributes associated with the graph for storing the modifications made by the graph algorithm. Furthermore, the graph algorithm may define the one or more derivative graphs as a snapshot and/or a view of the graph. In some example embodiments, changes to the temporary attributes of the graph may be propagated to a derivative graph that is defined as a view of the graph. By contrast, changes to the temporary attributes of the graph may be confined to the graph instead of being propagated to a derivative graph that is defined as a snapshot of the graph.

To further illustrate, Table 1 below depicts programming code implementing a graph algorithm operating on a graph g that defines a derivative graph o, which may be a subgraph of the graph g. As Table 1 shows, the programming code of the graph algorithm may include syntactic constructions (e.g., declarations) that define the derivative graph o as a snapshot of the graph g. Although not shown, it should be appreciated that the programming code may include different syntactic constructions for defining the derivative graph o as a view of the graph g.

Figure 2:
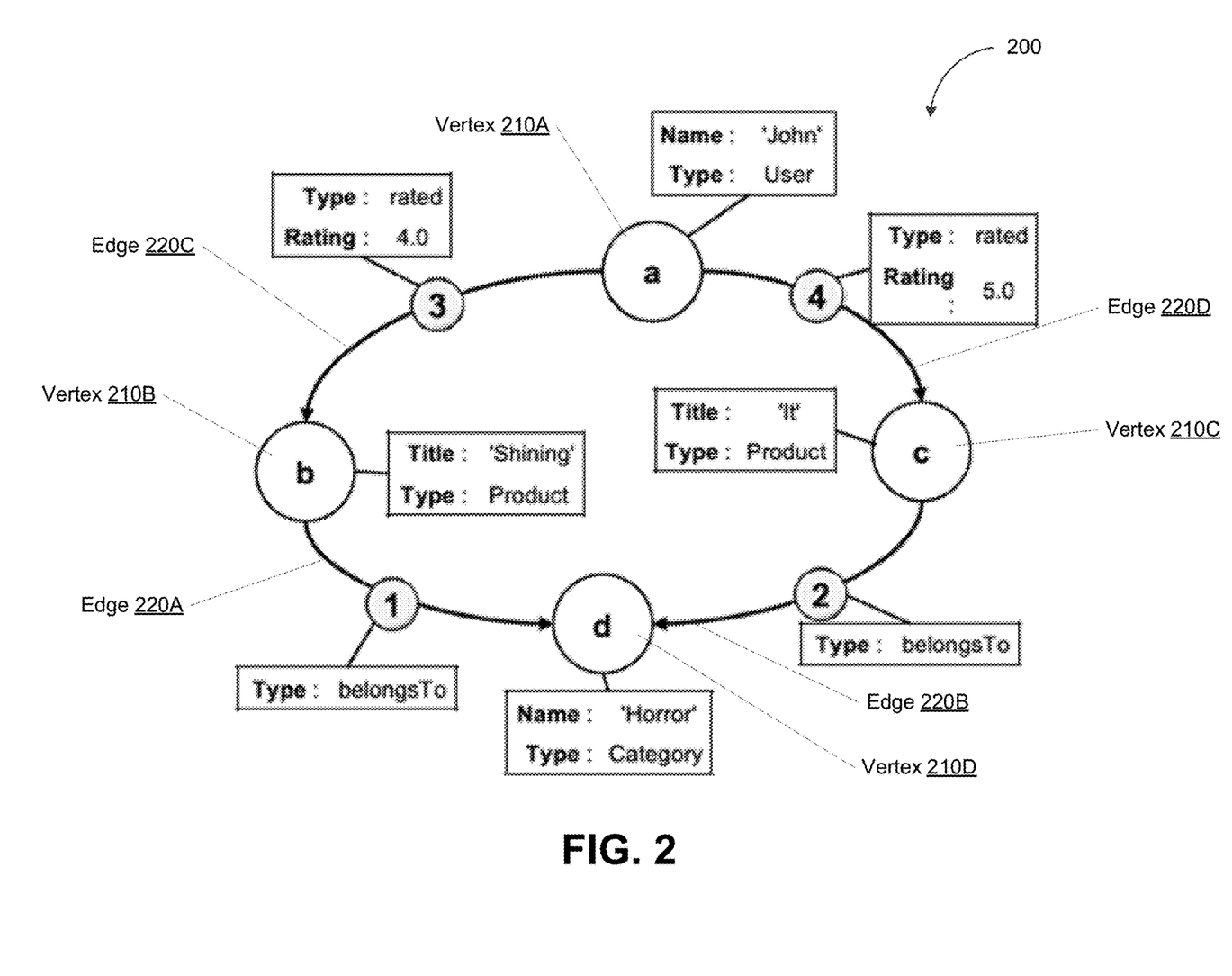
FIG. 2 depicts a graph, in accordance with some example embodiments.

Referring again to Table 1, the graph g may be associated with a temporary attribute "PET" and a temporary attribute "WEAPON," the value of which may be modified by the execution of the graph algorithm. As the derivative graph o is defined as a snapshot of the graph g, modifications to the value of the temporary attribute "PET" may not be propagated from the graph g to the derivative graph o. For example, the programming code for the graph algorithm may include a declaration that the derivative graph o is a snapshot. As such, the semantics of the programming code may indicate that the derivative graph o may be a snapshot of the graph g instead of a view of the graph g. Moreover, as shown in Table 1, the semantics of the programming code may define the scope of the temporary attributes. For instance, the temporary attribute "WEAPON" may be defined in the programming code subsequent to the derivative graph o. Accordingly, the temporary attribute "WEAPON" may be outside of the scope of the derivative graph o and may therefore be excluded from the derivative graph o.

corresponding to the graph 200 may include a plurality of vertices forming the graph 200 including, for example, a first vertex 210A, a second vertex 210B, a third vertex 210C, and a fourth vertex 210D. Alternatively and/or additionally, the graph data corresponding to the graph 200 may further include a plurality of vertices forming the graph 200 including, for example, a first edge 220A, a second edge 220B, a third edge 220C, and a fourth edge 220D. In some example embodiments, the graph data corresponding to the graph 200 may be stored in the database 115, for example, in the vertex table 120A and/or the edge table 120B. For instance, the vertex table 120A may store the key and/or the attributes associated with the first vertex 210A, the second vertex 210B, the third vertex 210C, and/or the fourth vertex 210D. Meanwhile, the edge table 120B m ay store the key and/or the attributes associated with the first edge 220A, the second edge 220B, the third edge 220C, and/or the fourth edge 220D.

To further illustrate, FIG. 2 shows each vertex and/or edge in the graph 200 as being associated with a key that uniquely identifies the corresponding vertex and/or edge. Furthermore, each vertex and/or edge in the graph 200 may also be associated with one or more attributes corresponding to additional properties. For instance, the first vertex 210A may be associated with the key "a," the second vertex 210B may be associated with the key "b," the third vertex 210C may be associated with the key "c," and the fourth vertex 210D may be associated with the key "d." Each of the first vertex 210A, the second vertex 210B, the third vertex 210C, and the fourth vertex 210D may also be associated with a "Title" attribute and a "Type" attribute. In some example embodiments, the database 115 may store the graph 200 by at least storing, in the vertex table 120A, the key and the attributes (e.g., "Title" and "Type") associated with the first vertex 210A, the second vertex 210B, the third vertex 210C, and/or the fourth vertex 210D.

Alternatively and/or additionally, the first edge 220A may be associated with the key "1," the second edge 220B may be associated with the key "2," the third edge 220C may be associated with the key "3," and the fourth edge may be associated with the key "4." Furthermore, each of the first edge 220A, the second edge 220B, the third edge 220C, and

TABLE 1

```
CREATE PROCEDURE "mySchema"."snapshotExample" (
) LANGUAGE GRAPH READS SQL DATA AS                          -- this procedure does not modify the primary graph data
BEGIN
    Graph g = Graph("GREEK_MYTHOLOGY", "GRAPH");
    ALTER g ADD TEMPORARY VERTEX ATTRIBUTE(Varchar(100) PET =   -- defining a writable temporary attribute for vertices of g
    NULL);
    Vertex zeus = Vertex(:G, 'Zeus');
    zeus.PET = 'Eagle';                                     -- modifying the value of a temporary attribute
    Graph o = Subgraph(:g, v IN Vertices(:g)                -- defining a subgraph o based on the value of RESIDENCE attr.
        WHERE :v."RESIDENCE" == 'Olymp');
    ALTER g ADD TEMPORARY VERTEX ATTRIBUTE(Varchar(100)     -- defining another temporary attribute 'WEAPON' for g
    WEAPON = NULL);
                                                            -- subgraph o does not have it according to snapshot semantics
    Vertex poseidon = Vertex(:o, 'Poseidon');
    Vertex zeus2 = Vertex(:o, 'Zeus');
    if (:zeus2.PET == 'Eagle') {                            -- true, because the subgraph was create after 'Eagle' assignment
        ALTER o ADD TEMPORARY VERTEX ATTRIBUTE(Varchar(100) WEAPON = NULL); -- subgraph o did not have 'WEAPON' attribute
        poseidon.WEAPON = 'Trident';
    }                                                       -- 'WEAPON' attribute disappears with the end of the scope
    zeus2.PET = 'Thunderbird';                              -- zeus.PET is still 'Eagle'
    zeus.PET = 'Sparrow';                                   -- zeus2.PET is still 'Thunderbird'
END;
```

FIG. 2 depicts a graph 200, in accordance with some example embodiments. Referring to FIGS. 1-2, graph data the fourth edge 220D may be associated with a "Type" attribute and/or a "Rating" attribute. In some example embodiments, the database 115 may store the graph 200 by at least storing, in the edge table 120B, the key and the attributes (e.g., "Type" and "Rating") associated with the first edge 220A, the second edge 220B, the third edge 220C, and/or the fourth edge 220D.

Figure 3A:
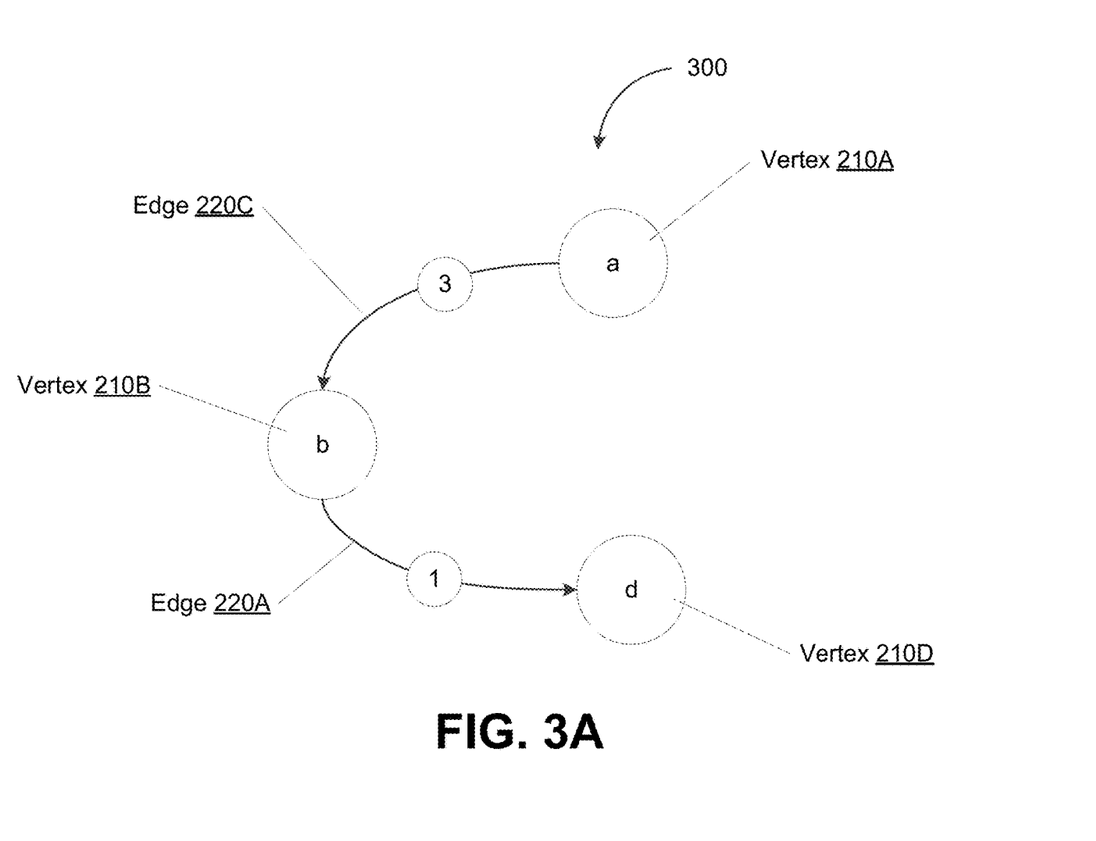
FIG. 3A depicts a sub-graph graph, in accordance with some example embodiments.
Figure 3B:
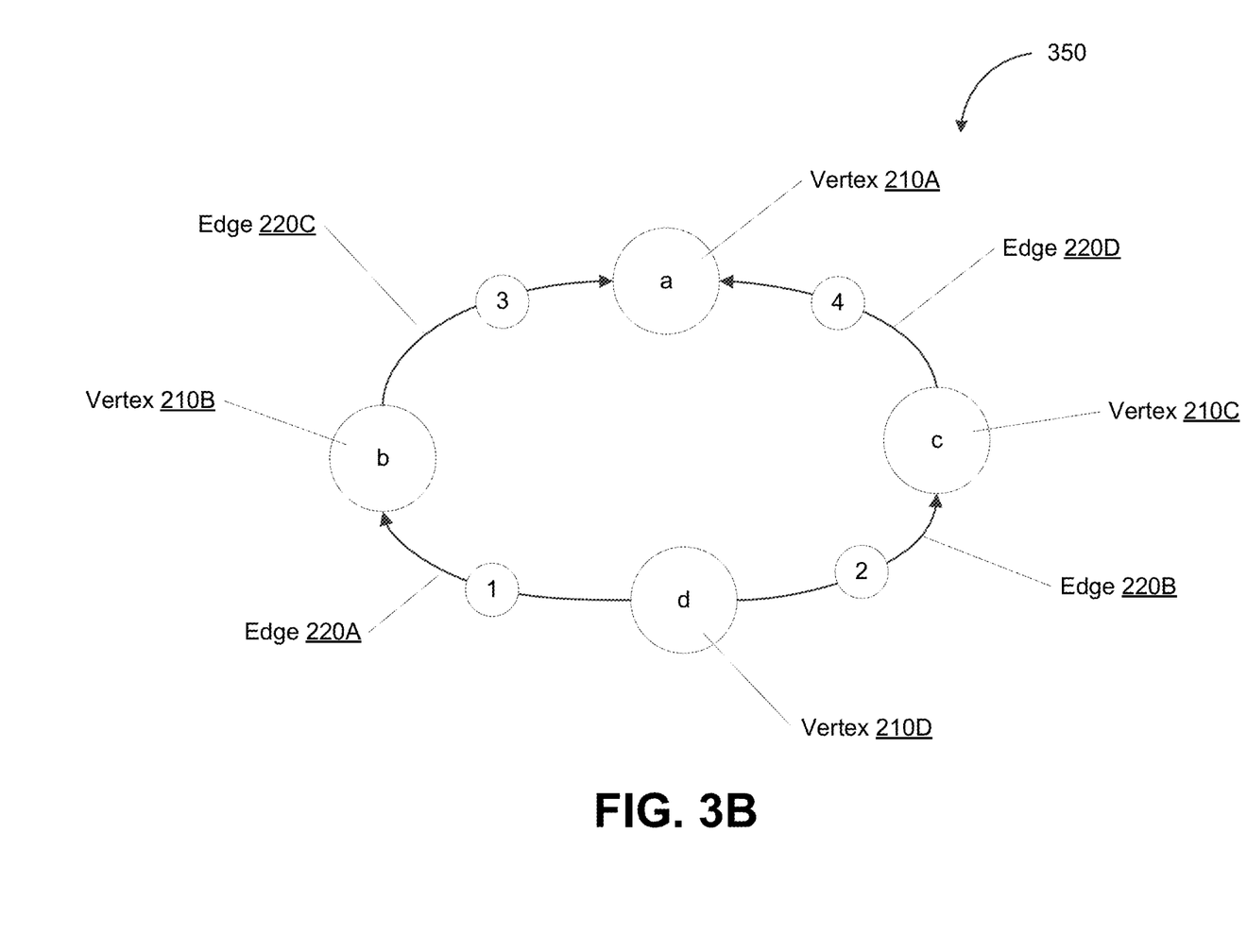
FIG. 3B depicts an inverse graph, in accordance with some example embodiments.

The client 130 may send, to the database management system 110, a request to execute a graph algorithm on the graph data corresponding to the graph 200. For example, the graph algorithm may be a predefined graph algorithm and/or a custom graph algorithm including, for example, shortest path, risk propagation, minimum flow, page rank, and/or the like. In some example embodiments, the graph algorithm may define one or more derivative graphs of the graph 200 including, for example, a sub-graph, an inverse graph, and/or the like. To further illustrate, FIGS. 3A-B depicts derivative graphs of the graph 200. It should be appreciated that the graph 200 may itself be a derivative graph of another graph. As such, in some example embodiments, executing the graph algorithm may include generating derivative graph of another derivative graph.

FIG. 3A depicts a sub-graph 300, in accordance with some example embodiments. Referring to FIGS. 2 and 3A, the sub-graph 300 may include some but not all of the vertices and/or edges from the graph 200. In some example embodiments, a sub-graph may include a subset of vertices that includes some but not all of the vertices from a parent graph. Furthermore, the sub-graph may include edges that both originates from and terminates at vertices included the subset of vertices. That is, the sub-graph may exclude an edge connecting two vertices if one of the two vertices is not part of the subset of vertices.

As shown in FIG. 3A, the sub-graph 300 may include a subset of vertices from the graph 200 that includes the first vertex 210A, the second vertex 210B, and the fourth vertex 210D. The sub-graph 300 may also include the first edge 220A and the third edge 220C. Both the first edge 220A and the third edge 220C may originate from and terminate at the first vertex 210A, the second vertex 210B, and/or the fourth vertex 210D. It should be appreciated that the second edge 220B and the fourth edge 220D may be excluded from the sub-graph 300 because the second edge 220B and the third edge 220D originate from and/or terminate at the third vertex 210C, which is not part of the subset of vertices included in the sub-graph 300.

FIG. 3B depicts an inverse graph 350, in accordance with some example embodiments. Referring to FIGS. 2 and 3B, the inverse graph 350 may include all of the vertices from the graph 200 including, for example, the first vertex 210A, the second vertex 210B, the third vertex 220C, and the fourth vertex 220D. The inverse graph 350 may also include all of the edges from the graph 200 including, for example, the first edge 220A, the second edge 220B, the third edge 220C, and the fourth edge 220D. However, in the inverse graph 350, the directionality of the first edge 220A, the second edge 220B, the third edge 220C, and the fourth edge 220D may be reversed. For example, in the graph 200, the first edge 220A originates from the second vertex 210B and terminates at the fourth vertex 210D. By contrast, in the inverse graph 350, the first edge 220A originates from the fourth vertex 210D and terminates at the second vertex 210B.

In some example embodiments, the client 130 may request to execute a graph algorithm on the graph 200 that requires the generation of one or more derivative graphs including, for example, the sub-graph 300, the inverse graph 350, and/or the like. For example, the one or more derivative graphs (e.g., the sub-graph 300, the inverse graph 350, and/or the like) may be defined as part of the programming code implementing the graph algorithm. Alternatively and/or additionally, the graph algorithm may define one or more temporary attributes for the graph 200. As noted, a temporary attribute may store modifications to the graph data associated with the graph 200, which may otherwise be read-only and not subject to any modifications. The database management system 110, for example, the graph data controller 114, may execute the graph algorithm by at least generating one or more derivative graphs for the graph 200 including, for example, the sub-graph 300, the inverse graph 350, and/or the like. Furthermore, the database management system 110, for example, the graph data controller 114, may execute the graph algorithm by at least generating the temporary attributes for the graph 200. The database management system 110 may, based on whether the derivative graphs are defined as snapshots and/or views of the graph 200, propagate changes to these temporary attributes from the graph 200 to the derivative graphs.

According to some example embodiments, changes to these temporary attributes of the graph 200 may or may not be propagated to the derivative graphs of the graph 200. For instance, changes to the temporary attributes of the graph 200 may be propagated to the sub-graph 300 and/or the inverse graph 350 if the sub-graph 300 and/or the inverse graph 350 are defined as views of the graph 200. By contrast, the changes to the temporary attributes of the graph 200 may be confined to the graph 200 if the sub-graph 300 and/or the inverse graph 350 are defined as snapshots of the graph 200. That is, where the sub-graph 300 and/or the inverse graph 350 are defined as snapshots of the graph 200, changes to the temporary attributes of the graph 200 may not trigger the same changes to the temporary attributes of the sub-graph 300 and/or the inverse graph 350.

Figure 4:
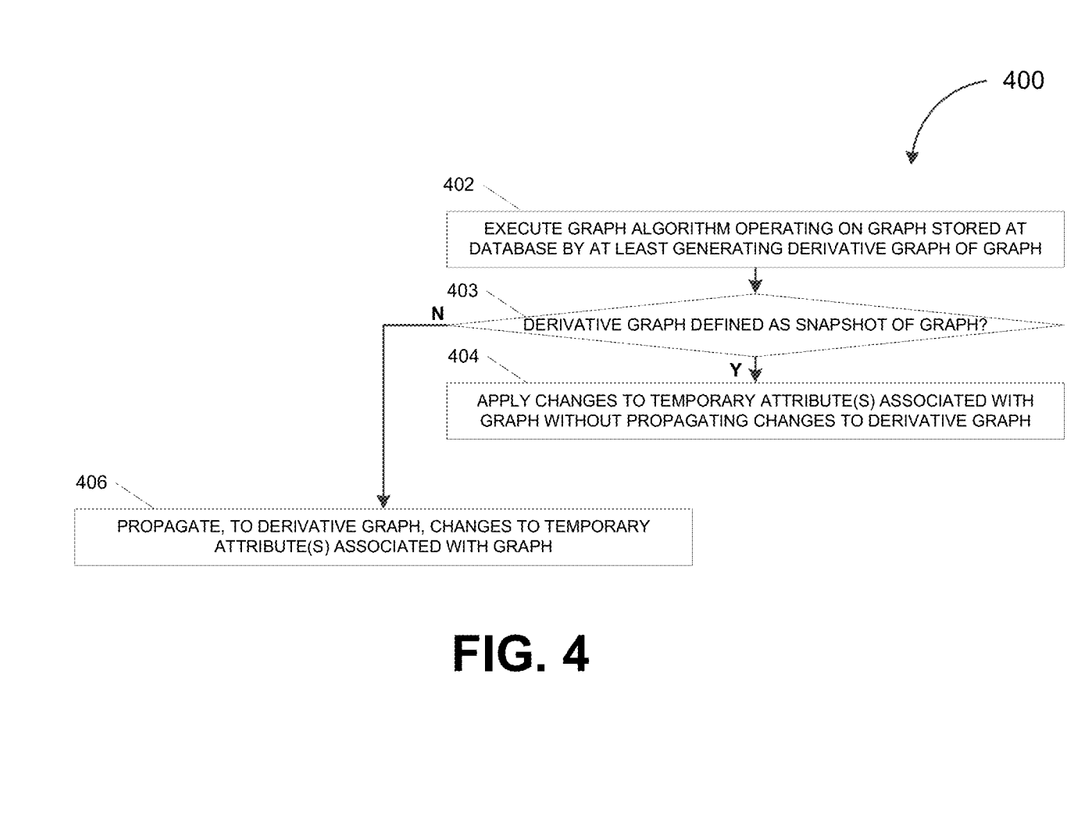
FIG. 4 depicts a flowchart illustrating a process for generating a derivative graph, in accordance with some example embodiments.

FIG. 4 depicts a flowchart illustrating a process 400 for generating a derivative graph, in accordance with some example embodiments. Referring to FIGS. 1-2, 3A-B, and 4, the process 400 may be performed by the database management system 110, for example, the derivative graph engine 112, to generate a derivative graph of the graph 200 including, for example, the sub-graph 300, the inverse graph 350, and/or the like. In some example embodiments, the database management system 110 may generate the derivative graph in order to execute, on the graph 200, a graph algorithm including, for example, shortest path, risk propagation, minimum flow, page rank, and/or the like.

At 402, the database management system 110 may execute a graph algorithm operating on a graph stored in the database 115 by at least generating a derivative graph of the graph. In some example embodiments, the client 130 may request the database management system 110 to perform, on the graph 200, a graph algorithm that requires the generation of one or more derivative graphs of the graph 200 including, for example, the sub-graph 300, the inverse graph 350, and/or the like. The graph algorithm may be executed based on the one or more derivative graphs. As such, the graph algorithm may define these derivative graphs, for example, by at least including a definition for these derivative graphs in the programming code implementing the graph algorithm.

As noted, graph data corresponding to the graph 200 may be stored in the database 115, for example, in the vertex table 120A and/or the edge table 120B. The graph data stored at the database 115, for example, in the vertex table 120A and/or the edge table 120B may be read-only. Accordingly, in some example embodiments, the graph algorithm may further define one or more temporary attributes for the graph 200, for example, by at least including a definition for these temporary attributes in the programming code implementing the graph algorithm. These temporary attributes may store modifications to the read-only graph data associated with the graph 200 including, for example, the addition of new attributes and/or the change of existing attributes associated with the vertices and/or the edges of the graph 200. Furthermore, the graph algorithm may define one or more derivative graphs of the graph 200 including, for example, the sub-graph 300, the inverse graph 350, and/or the like.

At 403, the database management system 110 may determine whether the derivative graph is defined as a snapshot of the graph. In some example embodiments, the semantics of the programming code implementing the graph algorithm may determine whether the derivative graph (e.g., the sub-graph 300, the inverse graph 350, and/or the like) is defined as a snapshot of the graph. For example, as shown in Table 1, the programing code implementing a graph algorithm may include a declaration that the derivative graph is a snapshot of the graph 200.

The database management system 110 may determine, at 403-Y, that the derivative graph is defined as a snapshot of the graph. As such, at 404, the database management system 110 may apply changes to one or more temporary attributes associated with the graph without propagating the changes to the derivative graph. For example, if the database management system 110 determines, based at least on the semantics of the programming code implementing the graph algorithm, that the derivative graph (e.g., the sub-graph 300, the inverse graph 350, and/or the like) is defined as a snapshot of the graph 200, the database management system 110 may confine changes to the temporary attributes of the graph 200. That is, the database management system 110 may avoid propagating, to the derivative graphs of the graph 200, the changes to the temporary attributes of the graph 200.

Alternatively and/or additionally, at 403-N, the database management system 110 may determine that the derivative graph is defined as a view of the graph. For example, in some example embodiments, the derivative graphs of the graph 200 (e.g., the sub-graph 300, the inverse graph 350, and/or the like) may be defined as a view of the graph 200 instead of a snapshot of the graph 200. Accordingly, at 406, the database management system 110 may propagate, to the derivative graphs, changes to one or more temporary attributes associated with the graph. For example, in the event that the derivative graph (e.g., the sub-graph 300, the inverse graph 350, and/or the like) is defined as a view of the graph 200, the database management system 110 may propagate, to the derivative graphs, any change that may be applied to the temporary attributes of the graph 200.

Figure 5:
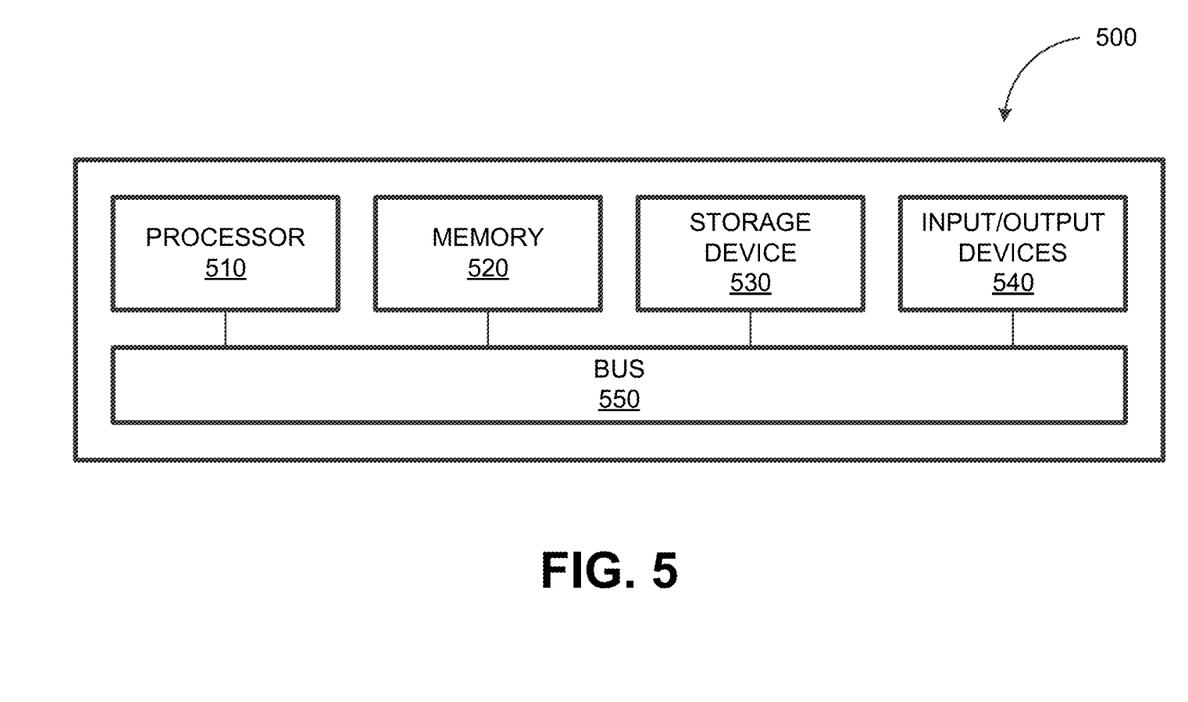
FIG. 5 depicts a block diagram illustrating a computing system, in accordance with some example embodiments.

FIG. 5 depicts a block diagram illustrating a computing system 500 consistent with implementations of the current subject matter. Referring to FIGS. 1 and 5, the computing system 500 can be used to implement the database management system 110 and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the database management system 110. In some example embodiments, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a solid state drive, a floppy disk device, a hard disk device, an optical disk device, or a tape device, or other suitable persistent storage means. The input/output device 540 provides input/output operations for the computing system 500. In some example embodiments, the input/output device 540 includes a keyboard and/or pointing device. In various implementations, the input/output device 540 includes a display unit for displaying graphical user interfaces.

According to some example embodiments, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some example embodiments, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning as an add-in for a spreadsheet and/or other type of program) or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random query memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
    at least one data processor; and
    at least one memory storing instructions which, when executed by the at least one data processor, result in operations comprising:
        responding to a request from a client to execute a graph algorithm by at least generating a derivative graph of a graph, the graph algorithm being executed on the graph, the graph being associated with a read-only graph data stored in a database, the executing of the graph algorithm a temporary attribute associated with the read-only graph data, the temporary attribute storing one or more modifications made to the read-only graph data by the executing of the graph algorithm, the read-only graph data including a plurality of vertices and one or more edges interconnecting the plurality of vertices, the database being a relational database that includes a vertex table and an edge table for storing the read-only graph data, and the read-only graph data being stored by storing a first attribute associated with each of the plurality of vertices and/or the each of one or more edges;
        in response to determining that the derivative graph is defined as a snapshot of the graph, applying a change to the temporary attribute associated with the graph without propagating the change to the derivative graph;
        in response to determining that the derivative graph is defined as a view of the graph, propagating the change to the derivative graph; and
        executing, based at least on the derivative graph, the graph algorithm.

2. The system of claim 1, wherein the graph algorithm modifies the read-only graph data by at least changing the first attribute, and/or adding a second attribute to each of the plurality of vertices and/or each of the one or more edges.

3. The system of claim 1, wherein the derivative graph inherits, from the graph, the temporary attribute such that the derivative graph includes the temporary attribute.

4. The system of claim 1, wherein the derivative graph is defined as the snapshot and/or the view based at least on a declaration included in programming code implementing the graph algorithm, and wherein the declaration indicates whether the derivative graph is the snapshot and/or the view of the graph.

5. The system of claim 1, wherein the derivative graph comprises a sub-graph of the graph, and wherein the sub-graph includes some but not all of a plurality of vertices and/or edges comprising the graph.

6. The system of claim 1, wherein the derivative graph comprises an inverse graph of the graph, and wherein the inverse graph reverses a directionality of one or more edges interconnecting a plurality of vertices comprising the graph.

7. A computer-implemented method, comprising:
responding to a request from a client to execute a graph algorithm by at least generating a derivative graph of a graph, the graph algorithm being executed on the graph, the graph being associated with a read-only graph data stored in a database, the executing of the graph algorithm modifying a temporary attribute associated with the read-only graph data, the temporary attribute storing one or more modifications made to the read-only graph data by the executing of the graph algorithm, the read-only graph data including a plurality of vertices and one or more edges interconnecting the plurality of vertices, the database being a relational database that includes a vertex table and an edge table for storing the read-only graph data, and the read-only graph data being stored by storing a first attribute associated with each of the plurality of vertices and/or the each of one or more edges;
in response to determining that the derivative graph is defined as a snapshot of the graph, applying a change to the temporary attribute associated with the graph without propagating the change to the derivative graph;
in response to determining that the derivative graph is defined as a view of the graph, propagating the change to the derivative graph; and
executing, based at least on the derivative graph, the graph algorithm.

8. The method of claim 7, wherein the graph algorithm modifies the read-only graph data by at least changing the first attribute, and/or adding a second attribute to each of the plurality of vertices and/or each of the one or more edges.

9. The method of claim 7, wherein the derivative graph inherits, from the graph, the temporary attribute such that the derivative graph includes the temporary attribute.

10. The method of claim 7, wherein the derivative graph is defined as the snapshot and/or the view based at least on a declaration included in programming code implementing the graph algorithm, and wherein the declaration indicates whether the derivative graph is the snapshot and/or the view of the graph.

11. The method of claim 7, wherein the derivative graph comprises a sub-graph of the graph, and wherein the sub-graph includes some but not all of a plurality of vertices and/or edges comprising the graph.

12. The method of claim 7, wherein the derivative graph comprises an inverse graph of the graph, and wherein the inverse graph reverses a directionality of one or more edges interconnecting a plurality of vertices comprising the graph.

13. A non-transitory computer readable medium storing instructions, which when executed by at least one data processor, result in operations comprising:
responding to a request from a client to execute a graph algorithm by at least generating a derivative graph of a graph, the graph algorithm being executed on the graph, the graph being associated with a read-only graph data stored in a database, the executing of the graph algorithm modifying a temporary attribute associated with the read-only graph data, the temporary attribute storing one or more modifications made to the read-only graph data by the executing of the graph algorithm, the read-only graph data including a plurality of vertices and one or more edges interconnecting the plurality of vertices, the database being a relational database that includes a vertex table and an edge table for storing the read-only graph data, and the read-only graph data being stored by storing a first attribute associated with each of the plurality of vertices and/or the each of one or more edges;
in response to determining that the derivative graph is defined as a snapshot of the graph, applying a change to the temporary attribute associated with the graph without propagating the change to the derivative graph;
in response to determining that the derivative graph is defined as a view of the graph, propagating the change to the derivative graph; and
executing, based at least on the derivative graph, the graph algorithm.

\* \* \* \* \*